Oct. 30, 1928.
A. H. WHITE
1,689,940
PROCESS OF MAKING FUEL GAS
Filed Jan. 14, 1920
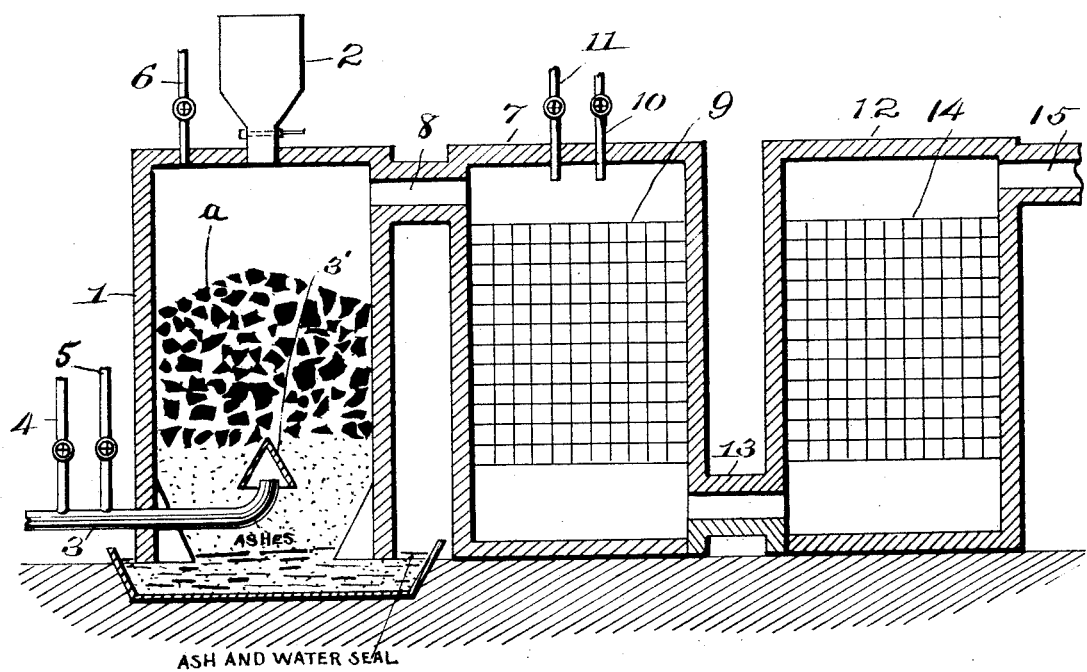

Patented Oct. 30, 1928.

1,689,940

UNITED STATES PATENT OFFICE.

ALFRED H. WHITE, OF ANN ARBOR, MICHIGAN.

PROCESS OF MAKING FUEL GAS.

Application filed January 14, 1920. Serial No. 351,512.

This invention relates to the manufacture of both water gas and producer gas of high thermal capacity and has for its principal objects the economical and efficient large scale production of either or both of such gases whereby an excellent substitute for natural gas is obtained that is suitable both for heating and illuminating purposes and is adapted to be distributed from central stations.

The use of a gaseous fuel having a thermal capacity of at least 200 B. t. u. per cubic foot presents many advantages for heating purposes over the direct use of a solid fuel, but its use has been limited by certain disadvantages attending its manufacture. Illuminating gas with a heating value of about 600 B. t. u. per cubic foot has been manufactured on a large scale by the destructive distillation of coal in retorts under conditions of manufacture which make it too expensive to be considered as a heating agent in most industries. Producer gas on the other hand has also been made in many installations by blowing steam and air through an incandescent bed of bituminous coal. The resultant gas, however, is so largely diluted with nitrogen that its heating value is only from 100 to 150 B. t. u. per cubic foot and it therefore cannot be economically distributed from a central installation but must be consumed on the premises.

What is known as carburetted water gas has attained a wide development as a gas which may be enriched to 600 B. t. u. per cubic foot or even higher, but its manufacture is a somewhat expensive and inefficient process. This process has been standardized for many years as an intermittent one of two steps. In the first step, termed the "blow", air is blown through a bed of coke or anthracite coal until it is heated to almost a white heat. The hot producer gas, composed mainly of carbon monoxide, carbon dioxide and nitrogen, is passed into adjacent vessels, commonly termed the carburetor and superheater, where it is burned by air admitted at several points. These vessels are lined with fire brick and filled with a checkerwork of the same material that is adapted to absorb a maximum of heat and serve as a regenerator. At the end of the blow, the fire bed of the generator is at a high heat and the brickwork of the carburetor and superheater at a lower red heat.

The second step or stage of the process as usually conducted is called the "run" and in this stage of the process steam is blown into the incandescent fuel bed producing what is known as blue water gas, which consists mainly of carbon monoxide and hydrogen with some carbon dioxide and nitrogen and considerable undecomposed steam. The blue water gas passes from the generator to the carburetor where it meets a spray of petroleum oil which is vaporized and cracked into permanent gases, tar, and carbon, as it passes through the carburetor and superheater, such decomposition being caused by the action of the high temperature and the contact surface of the brick checkerwork with its deposited carbon. The decomposition of the steam in the generator and of the petroleum in the carburetor and superheater both absorb heat so the temperature of the entire system falls throughout the run and consequently it has not been possible heretofore to maintain constant conditions. After about four minutes it is found that the temperature drops to such an extent that the run has to be discontinued. An elaborate set of valves must then be regulated and a blow of about four minutes is then necessary in order to reheat the system. Thus the process, as it has been well termed, is an intermittent one with constantly changing conditions which do not admit of close and efficient control of operation.

While it has long been known to gas chemists that it is theoretically possible to "blow" a mixture of oxygen and steam into a gas producer so as to maintain the fuel bed at a sufficiently constant temperature to permit of the production of the gas being carried on uninterruptedly, such knowledge has not, so far as I am aware, ever been practically applied. In this connection reference is made to the Patent No. 517,681 of April 3, 1894, and also the Patent No. 545,973 of September 10, 1895, wherein the employment of pure oxygen and steam is proposed for "blowing" a producer.

The importance of controlling the variable factors which influence the proper carburation of water gas has been recognized for many years. These variables include especially the temperature, pressure, time and also the nature and extent of the contact surface. It has also been recognized (see Journal of Gas Lighting, London, August 4, 1908) that there is a strong tendency for the valuable hydrocarbons of the ethylene and acetylene series to polymerize to tarry compounds at temperatures of 1100 to 1200° F. and that at 1500° F. there is very rapid decomposition with deposition of free carbon as well as a reaction between hydrogen and the unsaturated hydrocarbons to form a smaller volume of less valuable compounds as ethane and methane, the latter being decomposed into its elements especially when in contact with solid surfaces.

It is evident from the foregoing that it is highly important that the carburation should be conducted under controllable conditions which, once fixed upon, may be held substantially constant. Among the more important of these conditions is the maintenance of the initial cracking temperature sufficiently high to break up heavy petroleum molecules and the subsequent lowering of the temperature to complete the cracking of the insufficiently changed molecules of petroleum, while still shielding the sensitive unsaturated hydrocarbons from too high a temperature.

The water gas reaction $C+H_2O=CO+H_2$ which occurs in the gas generator is highly endothermic and proceeds more rapidly and completely at a high temperature, say 2000° F. or higher. The destructive distillation of coal should, however, take place at a lower temperature if the hydrocarbons are to be retained as such. The layer of bituminous coal in the top of a generator in present practice materially reduces the temperature of the gases, yet the result is distinctly unsatisfactory and a large part of the volatile matter of the coal is converted into soot and a heavy tar which is almost valueless and whose removal is difficult. This result could however be largely avoided if sufficient steam were present during the destructive distillation stage and were allowed to interact with the gas while still at a red heat.

In addition to the principal water gas reaction aforesaid, there is the reaction $CO+H_2O=CO_2+H_2$ which becomes predominant at lower temperature of 1000° to 1500° F. The heating value of the gas is substantially unchanged by this latter reaction, but since heat is evolved therein, it becomes of material aid in maintaining the temperature in the secondary reaction chamber. As the temperature drops to a low red heat, the original water gas reaction may be reversed so as to proceed in part as indicated by the equation $CO+H_2=C+H_2O$.

This is decidedly undesirable since the valuable carbon monoxide is converted to the worthless soot. It may however be minimized by the action of an excess of steam.

Although these three reactions have been discussed separately, it is of course well understood that the process in the generator is one of equilibrium and that the reactions change with every variation in temperature and gas composition. It is also to be understood that steam reacts with hydrocarbons and other products of destructive distillation as well as with carbon and carbon monoxide.

My investigations have led to the discovery that a mixture of oxygen and steam can be introduced into a gas generator in such a manner as to accomplish the continuous production of either carburetted water gas or producer gas with a much smaller consumption of fuel, a considerably higher output per machine and, in the case of producer gas, with a greater conservation of the hydrocarbon elements than has heretofore been deemed possible.

My invention is fully set forth and described in detail in the following description and drawing forming a part thereof, in which the figure shown is a longitudinal vertical section of an apparatus designed for practicing my said invention.

Referring to the drawing and the construction shown therein, the reference numeral 1 designates a gas generator which is adapted to be fed through a hopper 2 with suitable fuel, as for example coke, anthracite, or bituminous coal, or the like.

An inlet conduit 3, covered by a conical deflector 3', serves to introduce a mixture of oxygen and steam supplied from the pipes 4 and 5 respectively, into the fuel bed of said producer. An oil feed-pipe 6 serves to introduce petroleum oil or steam into the space immediately above the fuel bed when desired.

A vessel or carburetor 7, which is in communication through a conduit 8 with the producer, is provided with checkerwork 9 and oil and steam spray pipes 10 and 11 respectively that project into the space immediately above the said checkerwork.

A second vessel or superheater 12 communicates in turn with said carburetor through a conduit 13. This latter vessel derives its name from the fact that in the secondary combination during the "blow" of the producer, the superheater may often be hotter than the carburetor. The gases leave the superheater through a conduit 15 whence they pass after proper purification, interchange of heat and the like to the gas holder of a central distributing station, or, if desired, the same may be immediately consumed on the premises.

In carrying out my improved process for the manufacture of water gas and producer gas, I preferably proceed as follows:

1. For the manufacture of water gas, the generator 1 is either fed with coke, bituminous or anthracite coal or other suitable fuel. A mixture of oxygen and steam is then introduced from the pipes 4 and 5 respectively through conduit 3 and into the fuel bed $a$, the proportion of steam to oxygen being so adjusted that a temperature of preferably more than 1500° F., for example about 2000° F., is maintained in the fuel bed. If the ash is of such a nature that excessive amounts of clinkers are not formed, the temperature may safely rise even higher, but ordinarily a temperature of about 2000° F. to 2500° F. is most advantageous to the reaction.

If coke is used as the fuel, and oxygen (90%) and steam are injected thereinto, the weight of such oxygen being substantially equal to that of such steam, and the time allowed for reaction is such that half of the steam reacts with carbon and half escapes from the generator unchanged, the temperature of the escaping blue water gas will be about 1750° F. and the blue water gas will when hot contain about twenty percent by volume of steam and when cold will have a heating value of 280 to 300 B. t. u. per cubic foot. The gas escaping from the generator will have enough sensible heat to vaporize and fix petroleum entering through pipe 10 and decompose the resultant vapors into gas so as to bring the heating value of the gas to 500 to 600 B. t. u. per cubic foot. The temperature of the gases and the amount of sensible heat which they carry may be controlled by increasing or decreasing the proportions of oxygen to steam; an increase in oxygen giving a higher temperature to the fuel bed and more sensible heat in the producer gas, and an increase in steam lowering the temperature of the fuel bed and decreasing the sensible heat in the producer gas as it passes from the producer into the carburetor 7.

As is evident in present practice, the brickwork of the carburetor and superheater are heated during the blow so that they are distinctly hotter than the gases coming to them during the run. Each is filled with checkerwork to absorb heat during the blow and reheat the gas during the run.

According to present practice, upon the completion of the blow the steam is turned into the gas generator, and the blue water gas which is evolved passes through the pipe 8 into the carburetor 7. A spray of petroleum oil from the pipe 10 mixes with the incoming gas, becomes vaporized and is partially cracked by the heat of the checkerwork in vessels 7 and 12. The greatest absorption of heat is in the top of vessel 7 and vessel 7 cools rapidly. The result is that the gases from the petroleum treatment are, during the greater part of the run, subject to higher temperatures and more drastic conditions of destructive distillation as they traverse the apparatus.

In my hereindescribed process, as the gas passes from the fuel bed of the gas generator 1 into the carburetor 7, a jet of steam (or cold gas, if desired) may be injected into the same from the supply pipe 11 into the space above the checkerwork in order to lower the temperature and thereby to more effectively control the carburation temperature. If desired, steam may be introduced into the gases by means of pipe 6 as they pass through the space above the fuel bed of the producer 7 instead of in subsequence thereto. By the employment of steam or cold gas as aforesaid, it is possible to produce water gas at the temperature most favorable to the water gas reaction, viz, from 2000° to 2500° F. and also to carburet it at lower temperature under the control of the operator. As a consequence, the objectionable destructive distillation of hydrocarbons into hydrogen and carbon, due to prolonged heating at temperatures of some 2000° F. and upward, is to a large extent prevented. When the incoming gas meets a spray of oil from the pipe 10, moreover, owing to the absorption of heat by the vaporization and partial decomposition of the oil, the temperature of the mixture will fall to about 1300° F.

After leaving the carburetor, the gases pass through the vessel 12, at a steadily decreasing temperature, due to the absorption of heat by chemical action and loss by radiation. Since the brick checkerwork acts not exclusively as a regenerator but also as an oil cracking surface, and in this respect is rather detrimental in many cases, it may often be found to be preferable to have the vessels 7 and 12 merely provided with sufficient checkerwork as is required to thoroughly mix the oil vapors with the gas.

That this process permits of the control of almost all of the variables in the cracking process, is evidenced by the following illustrations:

A. If a petroleum product is to be used which is known to be difficult to gasify and to give best results when cracked at a relatively high temperature, and given a subsequent fixation treatment at a high temperature and for a period twenty-five per cent longer than normal, then the relative amount of oxygen in the mixture entering the generator is increased to give a higher initial temperature and the absolute amount of the mixed oxygen and steam introduced per minute is decreased so that a smaller volume of gas is made per minute and the mixed petroleum vapors and gas remain in the heated chambers for a longer period.

B. If a petroleum product is to be used which is known to do best when cracked at a relatively low temperature and given quick subsequent treatment at a low temperature, then the amount of oxygen in the mixture entering the producer is decreased so as to give a lower temperature in the top of the carburetor and the absolute volume of the mixed oxygen and steam is increased so that a larger volume of gas is made per minute so that the reaction time in the heated chambers is shorter. If desired, steam or a spray of water may also be introduced through the pipes 6 or 11 to still further lower the temperature.

C. In manufacturing water gas from bituminous coal instead of coke, a lower proportion of steam and more oxygen may be advantageously employed in the mixture blown into the generator 1 in order that there may be enough sensible heat in the gases to effect destructive distillation of the coal. If the generator be considered as being divided into two zones horizontally, an upper zone where bituminous coal is being distilled in an atmosphere of hot blue water gas and a lower zone where water gas is being formed from coke, steam and oxygen, and only ¾ lbs. of steam is injected with each pound of oxygen into the generator, the temperature of the gases leaving the zone of the water gas reaction with the coke will be approximately 2500° F. These gases will pass through the bituminous coal, causing its destructive distillation and emerge with a temperature of about 1400° F.

It is common practice with the present type of continuously blown producers to introduce some steam with the air, but the amount of steam is limited by the necessity of heating the large amount of nitrogen in the air. If however oxygen is used instead of air, a larger proportion of steam may be used and consequently there will be a greater amount of undecomposed steam in the producer gas emerging from the bed of solid fuel. This excess of steam will continue to act upon free carbon or hydrocarbons so long as the temperature is kept high enough. It will, therefore, aid in decomposing heavy tars into fixed gases and in converting into water gas any free carbon formed or carried over from the producer.

The especial point to which attention is drawn, is that the present practice does not permit the desirable excess of steam to be present in the destructive distillation process and in the subsequent secondary fixation process. The process here set forth does, however, allow a larger amount of steam to be present and therefore obtains a better utilization of the bituminous products of the coal, since the gas will not only be richer but the tar will be more fluid and less soot will be formed.

The temperature of destructive distillation of the coal, proportion of steam, and the time of secondary reaction or blow, may be controlled in my process as before explained by the proportions of oxygen and steam used and by the rate of blowing the generator. The gases from the destructive distillation of the coal will raise the heating value of the blue water gas to 300 to 340 B. t. u. per cubic foot. The destructive distillation of the coal takes place under more favorable conditions than in the usual present practice because of the fact that the diluent gas contains more hydrogen and steam than is the case when air is blown into the producer. Both hydrogen and steam at these temperatures tend to prevent the formation of and to break up the free carbon, and heavy tars which are disadvantageous products under present methods of operation of gas producers with bituminous coal. It is preferable to keep these vapors of the destructive distillation of the coal in contact with the steam and blue water gas for a longer time than is customary in present practice. This may be accomplished by placing after the producer a vessel such as the carburetor 7 wherein the steam and gases are allowed to react at a continuously decreasing temperature. The carburetor may, of course, be built as a part of the generator and the checkerwork filling may be in whole or in part dispensed with, since it is by no means essential to the process and aside from its action in mixing the gases might better be omitted. The heavy vapors which are the first products of the destructive distillation of the coal are further broken down under the aforesaid controllable conditions of my process so that a more efficient utilization of the hydrocarbons from the coal is obtainable.

D. In order to produce carburetted water gas from bituminous coal, the generator is operated exactly in the manner just described and the gases and vapors are evolved at whatever temperature proves most desirable. Less oil need be sprayed through the pipe 10, because the heating value of the water gas is already 50 to 60 B. t. u. per cubic foot higher than if water gas had been produced by employing coke in lieu of bituminous coal in the generator. The vapors from the coal and oil proceed together through the fixing chamber and respond similarly to treatment.

The continuous operation described herein has various other advantages. The controllable and constant temperature of the fuel bed allows the temperature to be kept always below that of clinker formation. The constant conditions throughout the process promote efficient operation. The elimination of the intermittent operation in water gas manufacture, decreases the cost of apparatus and substantially triples the unit output. In the old intermittent process, whenever the change was made from the run to the blow, and vice versa, a portion of the water gas and the oil in the system was lost through combustion or purging. This does not take place with my new method as herein specified. Moreover, the elimination of the nitrogen allows the reaction time within the producer to be longer without decreasing the individual production of each producer, while the slower rate of blowing lessens the amount of dust carried over with the gas.

Favorable conditions for a large yield of ammonia from bituminous coals may be maintained since the destructive distillation takes place at a controllable temperature and in the presence of an excess of steam and inert gas which rapidly sweeps the ammonia into a zone of lower temperature without much contact with surfaces which act to promote its decomposition.

Although in the accompanying drawing I have illustrated substantially the present type of carburetted water gas apparatus, with only slight modifications, it is often preferable, so far as this is feasible in practice, to decompose the hydrocarbons without contact with solid surfaces. This may be accomplished either by reducing the amount of checkerwork or even entirely eliminating the same as hereinbefore stated or by substituting suitable baffles to insure the proper mixing of the gases and the control of their direction of flow. Preferably also the vessels 7 and 12 are, in such cases, lined with suitable heat insulating material to prevent loss of heat by radiation.

In the foregoing description I have used the terms oxygen, or oxygen (90%) to indicate a commercial grade of oxygen probably derived from the air, or contaminated with air and therefore containing some nitrogen. The nitrogen is not an advantage, and the percentage to be allowed will be governed entirely by the cost of an impure as compared with a pure oxygen. An upper limit of 25 percent nitrogen in the oxygen would seem to be the maximum which would be economical. Producer gas manufactured by the present methods wherein a mixture of steam and air is blown continuously through a bed of coal or coke usually contains more than 50 percent of nitrogen. If a mixture of oxygen and steam is used according to my process as described above, the nitrogen in the finished gas will vary with the purity of the oxygen used but will be less than 15 percent.

It will be noted that in all of the foregoing illustrations of my process, the only heat generated (except such as may be generated in minor chemical reactions such as instanced in the foregoing description) is from the combustion of oxygen with the solid fuel in the producer 1. There is no introduction of air or oxygen for secondary combustion and no supply of heat through contact with a superheated fuel bed, or bricks or by other regenerative methods as in present practice. All of the heat needed for the destructive distillation of the bituminous coal or oil, and the heat absorbed by reaction of steam with the products in vessels 7 and 12 is derived from the heat liberated by the combustion of oxygen and coke in producer 1. This continuous, self-developed or what may be appropriately termed internally developed source of heat for the various reactions, I have termed autogenous heat.

Having thus described my invention, what I claim and desire to secure by U. S. Letters Patent is:—

1. The continuous process of making combustible gas with a heating value of over 200 British thermal units per cubic foot, which consists in substantially continuously blowing a charge of solid fuel within a gas generator with a gaseous mixture whose principal reactive constitutents are oxygen, and steam in such proportions and so regulated in quantity that the fuel bed is continuously maintained at not less than a red heat and combustible gas is evolved, introducing enriching carbonaceous material derived from an external source into this hot gas capable of itself undergoing destructive distillation at a red heat and reacting with said hot gases to form gaseous hydrocarbons, and causing it to undergo destructive distillation and further interaction with the hot combustible gas out of contact with metallic surfaces and at temperatures which decrease slowly and are maintained principally by the energy resulting from the reactions in the fuel charge in the generator, whereby substantial destructive decomposition into free carbon of the hydrocarbons so formed is avoided.

2. The continuous process of making fuel gas with a heating value of over 200 British thermal units per cubic foot, which consists in continuously blowing a charge of solid carbonaceous fuel within a gas generator with a mixture whose principal reactive constitutents are oxygen and steam, such mixture being so proportioned and regulated in quantity as to develop sufficient autogenous heat to prevent the average temperature of the charge falling below a point at which effective production of fuel gas occurs, introducing oil derived from an external source into direct contact with the resultant hot fuel gas, and effecting destructive distillation and interaction of such oil so introduced with said hot fuel gas principally by the heat of formation of the fuel gas produced in said generator.

3. The continuous process of making combustible gas, which consists in substantially continuously blowing a charge of solid fuel within a gas generator with a mixture of oxygen, containing less than 25% by volume of nitrogen, and of steam in such proportions and so regulated in quantity that the fuel bed is continuously maintained at not less than a red heat and blue water gas is evolved by the autogenous heat developed in such retort, causing oil derived from an external source to directly contact with the said hot blue water gas evolved, and effecting the destructive distillation of such oil while mixed with said water gas principally by the energy resulting from the reaction in the said fuel charge.

4. The continuous process of making fuel gas of a thermal value exceeding 200 B. t. u. per cubic foot, which consists in substantially continuously blowing a charge of solid fuel within a gas producer with a gas consisting essentially of oxygen containing less than 25 per cent of nitrogen by volume, in admixture with steam, such mixture being so proportioned and regulated in quantity as to develop sufficient autogenous heat to prevent the average temperature of the charge falling below 1500° F. and to cause the fuel gas formed to contain at least 20 per cent by volume of undecomposed steam, and causing oil derived from an external source to contact directly with the hot fuel gases and to undergo destructive distillation and interaction with said hot gases at temperatures maintained principally by the heat of formation of the fuel gas.

5. In the process of continuous production of combustible gas with a heating value of more than 200 British thermal units per cubic foot, the steps which consist in blowing a charge containing solid fuel while contained within a generator, with oxygen and steam, cooling the hot blue water gas so produced with an aqueous current, then introducing liquid hydrocarbon material directly into the generator, causing its vaporization by the sensible heat of the combustible gas generated therein, thereby cooling the combustible gas, and causing further interaction between the gases and products so obtained at progressively diminishing temperatures, while maintaining the same in extensive contact with highly heated refractory nonmetallic surfaces.

6. The continuous process of making combustible gas with a heating value over 200 British thermal units per cubic foot, which consists in substantially continuously blowing a charge of solid fuel within a gas generator with a mixture of oxygen, containing less than 25 per cent by volume of nitrogen, and of steam, in such proportions and so regulated in quantity that the fuel bed is continuously maintained at not less than a red heat and blue water gas is evolved, then introducing enriching suspended carbonaceous matter capable of reacting with such hot gas and forming gaseous hydrocarbons into the said hot blue water gas and causing it to become gasified while suspended in the stream of hot gas principally by the energy resulting from the reactions in said fuel charge, thereby avoiding substantial decomposition of the hydrocarbons into free carbon.

7. The continuous process of making combustible gas with a heating value of over 200 British thermal units per cubic foot, which consists in substantially continuously blowing a charge of solid fuel within a gas generator with a gaseous mixture whose principal reactive constituents are oxygen and steam in such proportions and so regulated in quantity that the fuel bed is continuously maintained at not less than a red heat and hot blue water gas is evolved containing when hot, a large proportion of the original steam introduced still in an undecomposed state, introducing enriching carbonaceous material derived from an external source into this hot gas and capable of reacting with the hot gas and forming gaseous hydrocarbons and causing it to undergo gasification and further interaction with the hot blue water gas through the energy resulting from the reactions in the fuel charge in the generator, whereby substantial destructive decomposition into free carbon of the hydrocarbons so formed is avoided.

8. The continuous process of making combustible gas of a thermal value exceeding 200 British thermal units per cubic foot, which consists in continuously blowing into the lower portion of a charge of bituminous coal in a gas generator a regulated quantity of a mixture of oxygen, containing less than 25 per cent of nitrogen by volume, and of steam, in such proportions and so regulated in quantity that the temperature of the fuel zone of water gas production in such generator continuously exceeds 1500° F. and blue water gas is formed which contains a large percentage of the original steam introduced in an undecomposed state, periodically charging fresh bituminous coal into the upper part of said generator and causing said hot blue water gas to pass through such fresh coal and react therewith, whereby substantial destructive decomposition into free carbon of any hydrocarbons so formed is avoided.

Signed at Ann Arbor, in the county of Washtenaw and State of Michigan, this 8th day of January, 1920.

ALFRED H. WHITE.